Aug. 31, 1954  A. A. MONASTERIO  2,688,098
EMANATOR FOR RADIOACTIVE GAS
Filed Aug. 17, 1951
Fig. 1.
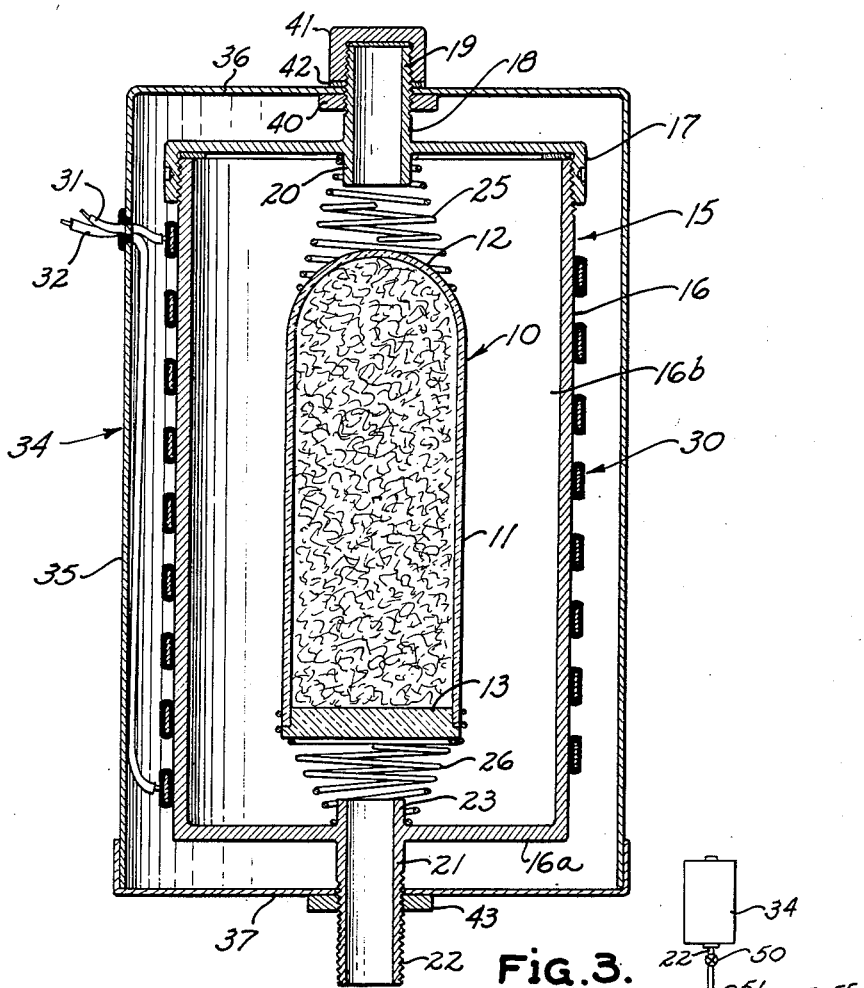
Fig. 3.
Fig. 2.
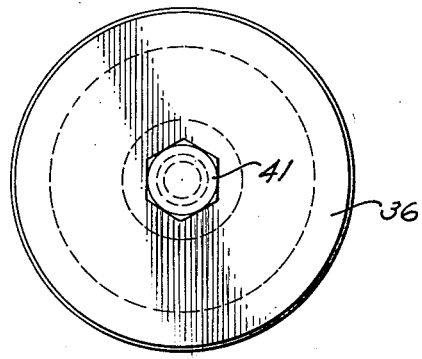
INVENTOR.
AUGUSTO A. MONASTERIO
BY
ATTORNEY.

Patented Aug. 31, 1954

2,688,098

UNITED STATES PATENT OFFICE 2,688,098

EMANATOR FOR RADIOACTIVE GAS

Augusto A. Monasterio, Los Angeles, Calif.

Application August 17, 1951, Serial No. 242,304

3 Claims. (Cl. 250—106)

This invention relates generally to emanators for radioactive gases such as radon, thoron, etc., from radio active substances or compounds such as radium bromide, thorium bromide, and the like.

Prior systems for generating radon gas, for example, have involved the passage of a current of oxygen through a cylinder containing a solution of radium bromide. The oxygen picks up and carries out the radon gas which has accumulated in the solution. This system has several disadvantages, among which may be mentioned the fact that the oxygen gurgling through the solution of radium bromide produces a kind of jet atomization or nebulization, which rapidly wastes away the solution and the radium which it contains. Again, this system requires elaborate filtration in order to prevent droplets of the radium solution from passing through the gas outlet.

The object of the present invention is to provide an improved emanator or generator for radon, thoron and the like, avoiding use of liquid solutions of the radio active source compound, and permitting controlled delivery of the desired radioactive gas.

The present invention provides an emanator based on the principle of dry vacuum heat extraction. The emanator in a preferred form comprises, broadly stated, a closed porous capsule, composed for example of porous porcelain, filled with a carrier substance such as asbestos wool, fiber glass, or some other inert substance, preferably of a fibrous nature, which substance has been previously impregnated with a solution of radium bromide, for example, and thoroughly desiccated. The radium element is thus widely distributed, and adherent to the carrier fibers. The porous capsule permits the passage through its pores of emanated radon gas, but excludes the passage of radium particles. This capsule as so prepared is shock proof mounted, preferably between springs, inside a suitable steel container, with a clearance space all around. The exterior wall of this steel container is surrounded by an electric resistance heating element, and connections are made from the interior of the steel container to a vacuum pump. The electrical heating element establishes a temperature of the order of 500° F. inside the container. The vacuum pump is operated to create a vacuum of, for example, 30 inches of mercury inside the container. Under the heat and vacuum conditions so provided, radon gas emanations are drawn through the wall of the porcelain capsule, leaving the whole of the radium inside, and the radon gas so obtained is delivered to a storage tank, as to be described in more particular hereinafter.

The invention will be more fully understood from the following detailed description of one present illustrative embodiment thereof, reference for this purpose being had to the accompanying drawings, in which:

Figure 1 is a longitudinal medial section through an emanator in accordance with the invention;

Figure 2 is a top plan view of the emanator of Figure 1; and

Figure 3 is a diagrammatic view showing the emanator connected to a storage tank and vacuum pump.

In the drawings, numeral 10 designates a porous capsule, composed of porcelain or other porous material pervious to gas but impervious to liquid or solid substances. This capsule 10, as here shown, comprises a cylinder 11, having a rounded end or dome 12 at one end, and closed at the other by a porous snugly fitting but removable cap or plug 13.

The capsule 10 is mounted inside a storage container 15, preferably comprising a stainless steel cylinder 16, provided at the top with a tight fitting threaded cap 17, and having a closed bottom end 16a. Cap 17 is preferably formed with an axially positioned nipple 18 extending upwardly therefrom, and screw-threaded, as indicated at 19. Extending inwardly from the cap is a tubular inward extension 20 of nipple 18. The bottom wall 16a of cylinder 16 is similarly provided with an axially positioned nipple 21, threaded as at 22, and has a short inward extension 23 of said nipple 21. The capsule 10 is shock mounted between spiral coil springs 24 and 25, whose small ends are seated against cap 17 and bottom wall 16a, respectively, being centered by tubular members 20 and 23, as shown. Substantial clearance space, typically of the order of an inch, is provided between the capsule 10 and the container 15. Wrapped in a spiral around the cylinder 15 is an electrical resistance heating element, generally designated by numeral 30, the two leads for this heating element being indicated at 31 and 32.

An exterior sheet metal case 34 surrounds cylinder 15, with suitable clearance, and as here shown comprises a cylinder 35 having an integral closure 36 at one end and a closure cap 37 at the other. Suitable openings in end wall 36 and cap 37 pass the threaded nipples 18 and 21. A nut threaded on nipple 18 is set up against the inside of closure wall 36, and a cap 41 threaded onto the extremity of nipple 18 is set up against wall 36, a gasket 42 preferably being used between said cap and wall 36. The exterior casing 34 is thus fixed to the container 15 at one end. A nut 43 threaded onto nipple 21 at the other end is set up against cap 37 to fix the casing 34 to the container 15 at the opposite end.

Inside the capsule 10 is placed a mass of carrier material (not shown) coated or impregnated with the desired radioactive element, and this carrier material is preferably of a fibrous nature, such as asbestos wool, fiber glass, or the like. As already mentioned, this carrier material is first impregnated with a solution of the radium element, for example, radium bromide, and thereafter thoroughly desiccated. The radium is thus widely disseminated, and is present in a large total surface area. Radon gas emanating from the radium bromide carried by the asbestos wool is capable of passing readily through the walls of the porous capsule 10. The walls of the capsule are impervious, however, to radium particles.

As shown in Figure 3, largely in schematic form, a needle valve 50 is connected to nipple 21, and said needle valve is connected by tubing 51 to a small tank 52. A vacuum pump V is connected through valve 54 to tank 52, and said tank is also fitted with an outlet tube 55, controlled by a valve 56.

In operation, valve 56 is first closed, and valves 50 and 54 are opened. Electrical current is delivered to heating element 30, maintaining a temperature inside container 15 of the order of 500° F. Under such temperature conditions, emanation of radio active gas within the capsule is greatly accelerated. Vacuum pump V is operated, and acts through tank 52 and the connecting tubing 51 to pull a vacuum inside the clearance space 16a within container 16. This vacuum is preferably of the order of 30 inches of mercury, and acts to draw the radio active gas, radon in this instance, through the walls of the porous capsule into the space 16b inside container 15, and thence through outlet nipple 21 and tubing 51 into tank 52. Under these conditions radon gas is accumulated inside tank 52, and when a sufficient charge has been so obtained, the vacuum pump is stopped and valves 50 and 54 are closed. The accumulated supply of radon gas may subsequently be delivered through outlet tube 55 by opening valve 56.

The capped nipple 18 is provided to permit flushing out the interior of the container 15 for cleaning purposes after a substantial period of use. Normally, the threaded cap 41 is maintained in position, as shown.

The emanator as thus described provides an easily controlled source of radon gas, or other radio active gas, and is simpler, less expensive, and less subject to loss or wastage of the radium parent material than with any other emanator with which I am familiar. Further, complete assurance is provided that the radium particles inside the capsule will not be permitted to escape with the radon gas.

It is of course to be understood that the drawings and description disclose merely one present illustrative embodiment of my invention, and that various changes in design, structure, and arrangement may be made without departing from the spirit and scope of the appended claims.

I claim:

1. A radioactive gas emanator comprising the combination of a closed container, a closed capsule of porous material having walls pervious to radioactive gas but impervious to radioactive salts, a carrier material in said capsule carrying a radioactive salt, said capsule mounted inside said container with a clearance space between said container and said capsule, an electrical resistance heating element mounted on said container for heating the same, and a gas outlet leading from said clearance space.

2. A radioactive gas emanator comprising the combination of a cylindrical container having an end closure at one end and a closure cap at the other, a capsule of porous material, pervious to radioactive gas but impervious to radioactive elements or salts, positioned inside said container, with a clearance space between said capsule and container, said capsule having an access opening and a closure therefor, a fibrous carrier body impregnated with a radioactive salt enclosed in said capsule, springs mounting said capsule inside said container out of engagement with the container walls, an electrical resistance heating element wrapped around said container, and a gas outlet nipple projecting from said container opening inside said clearance space.

3. A radioactive gas emanator comprising the combination of a tightly closed porous capsule having porous walls pervious to radioactive gas but impervious to radioactive salts, a fibrous carrier body impregnated with a radioactive substance completely enclosed inside said capsule, a closed metallic container enclosing said capsule, with a clearance space between a wall of said capsule and a wall of said container, means for heating said capsule, and a gas outlet leading from said clearance space.

References Cited in the file of this patent

UNITED STATES PATENTS

| Number | Name | Date |
|---|---|---|
| 2,020,725 | Fritze et al. | Nov. 12, 1935 |
| 2,497,213 | Downing | Feb. 14, 1950 |
| 2,528,547 | Reilly et al. | Nov. 7, 1950 |
| 2,582,282 | Rothstein | Jan. 15, 1952 |

OTHER REFERENCES

Admission of Pure Gases to Vacuum Systems, by E. Leonard Jossem, from Review of Scientific Instruments, May 1940, pp. 164–166.